United States Patent

[11] 3,627,420

| [72] | Inventor | Walter Leslie Crider<br>Cincinnati, Ohio |
|---|---|---|
| [21] | Appl. No. | 14,274 |
| [22] | Filed | Feb. 26, 1970 |
| [45] | Patented | Dec. 14, 1971 |
| [73] | Assignee | The United States of America as represented by the Secretary of Department of Health, Education and Welfare |

[54] METHOD OF DETECTING HALIDES BY FLAME CHEMILUMINESCENCE
8 Claims, 4 Drawing Figs.

[52] U.S. Cl. .................................................. 356/87,
23/232, 23/254, 356/187
[51] Int. Cl. ........................................... G01j 3/30,
G01n 21/58
[50] Field of Search ............................ 23/232, 232
R, 232 C, 232 E, 254, 254 R, 254 E; 356/87, 187

[56] References Cited
UNITED STATES PATENTS

| 3,423,181 | 1/1969 | Dimick et al. ............... | 23/232 E X |
| 3,425,806 | 2/1964 | Karmen ...................... | 23/232 C |
| 3,489,498 | 1/1970 | Brody et al. ................. | 356/187 |

OTHER REFERENCES
Margoshes et al., " Emission Spectrometry," Analytical Chemistry, Vol. 40, No. 5, Apr. 1968, pp. 23 R, 237 R and 238 R relied on Primary Examiner—Ronald L. Wibert
Assistant Examiner—F. L. Evans
Attorney—Holman & Stern ABSTRACT: A method for detecting the presence of halides in gases is described whereby a halide-containing gas sample is contacted with a hydrogen-oxygen flame and the spectral emission produced by the flame chemiluminescence of the halide is analyzed.

PATENTED DEC 14 1971

INVENTOR.
WALTER LESLIE CRIDER
BY Holman & Stern
ATTORNEY

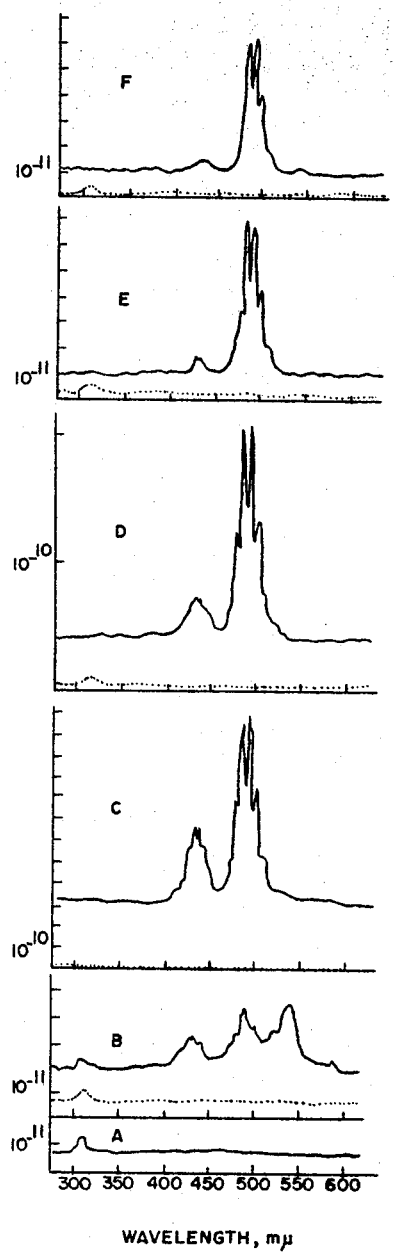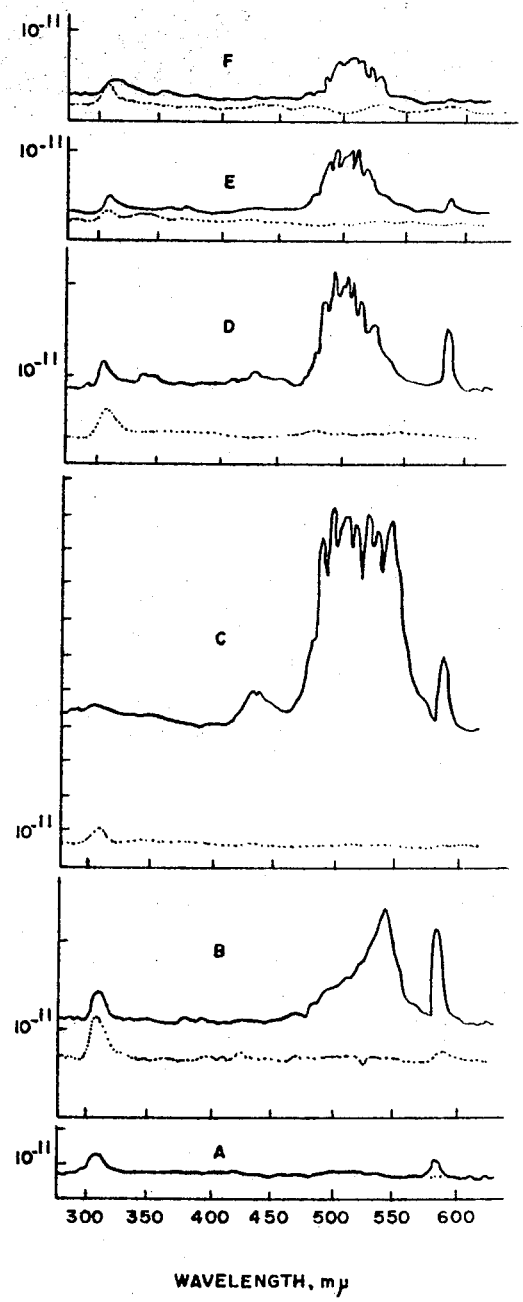
Fig. 3
Fig. 4

METHOD OF DETECTING HALIDES BY FLAME CHEMILUMINESCENCE

BACKGROUND OF THE INVENTION

The present invention relates to a method for detecting the presence of halides, particularly organic halides, in gases, such as air, by the technique of flame chemiluminescence.

Many varied methods have been heretofore proposed for detecting the presence of halides in gases. Of all of the methods known for detecting the presence of substances in gases, however, none is more efficient nor more accurate than flame spectrophotometric methods. One such method, which is particularly advantageous is that which depends for detection of an unknown substance upon the analysis of the spectral emission of the flame chemiluminescence of the substance. In simpler terms, the method consists of adding the substance in vapor form to a flame of constant composition and observing the characteristics of the spectral emission of the luminescence produced as a result of the substance being burned in the flame. By comparing the spectral emission with various previously determined standard emissions, both the nature and quantity of the substance may be ascertained.

Unfortunately, halides do not readily lend themselves to detection according to this method. The problem is particularly troublesome with respect to the detection of organic halides. Heretofore, it has been found impossible to produce an organic halide based chemiluminescence of sufficient stability and reproducibility to enable accurate detections. Since the flame spectrophotometric methods are highly advantageous as a result of their relative simplicity and high degree of accuracy, various attempts have been made to adapt these methods to the detection of halides.

One such method involves the intermediate conversion of the halide to the halide of a metal such as copper or indium. Since the various metallic halides burn with a characteristic flame, the presence of a halogen in the original sample is verified. The intermediate metallic halide may be formed in a variety of ways. One proposed method involves positioning the metal in or near the flame to render it sufficiently hot to react with the halogen to be detected.

As is readily apparent to those skilled in the art, these methods are disadvantageous for a variety of reasons. The need for the intermediate formation of a metallic halide prior to detection requires extensive modification of the conventional flame spectrophotometric apparatus in order to provide for the metal-halogen reaction. Moreover, the introduction of a metal into the system involves the addition of a new variable thereby decreasing the accuracy of the method. The metal itself has its own characteristic flame spectrum which will deleteriously affect the spectrum produced by the metallic halide.

Moreover, the inclusion of foreign metals in the system raises the possibility of the introduction of impurities and contaminants therein which will deleteriously affect the analysis. In addition, the inclusion of extraneous elements in the system requires the extensive modification of conventional flame spectrophotometric apparatuses. The added expense involved in adapting conventional systems for the introduction of metals therein renders these methods commercially unattractive.

Accordingly, it is an object of the present invention to provide a method for the detection of halides by flame chemiluminescence which may be carried out utilizing a conventional flame spectrophotometric system.

It is a further object of the present invention to provide a method for the detection of halides by flame chemiluminescence which does not require the introduction into the system of a foreign element.

These and other objects of the invention will become apparent from the following description of the invention.

FIG. 1 is a block diagram of an apparatus suitable for use in flame chemiluminescence analyses according to this invention; and FIGS. 2, 3 and 4 are graphical representations illustrative of chemiluminescence spectra.

SUMMARY OF THE INVENTION

The method of the present invention comprises contacting a gas containing the halide to be detected with a hydrogen-oxygen flame and analyzing the spectral emission, produced by the chemiluminescence of the halide. The flame is produced by the combustion of a mixture of hydrogen and an oxygen source wherein the $H_2:O$ ratio is approximately 1.

DETAILED DESCRIPTION OF THE INVENTION

The invention is predicated on the discovery that halides may be detected in gases by flame chemiluminescence methods provided that the flame is produced by the combustion of a mixture of hydrogen and oxygen source wherein the $H_2:O$ ratio is within a certain critical range, namely approximately 1. As will be apparent from the discussion hereinafter, flames produced from $H_2:O$ ratios outside of a range of from about 1.0 to 1.5 do not yield characteristic flame chemiluminescent spectra of sufficient stability and intensity to enable precise determinations.

Although the method of the invention is applicable to the determination of any halide, it is particularly adapted for the determination of organic halides in air. Most suitably, the method of the invention is adapted for the detection of organic chlorides, bromides and iodides, e.g., the alkyl halides such as methyl chloride, methyl iodide, ethylene dibromide, ethylene dichloride, bromobenzene, etc. It is to be understood, however, that the method of the invention is applicable to the detection of any organic halide capable of combustion in a hydrogen-oxygen flame of the composition set forth above.

Although particularly adapted for the detection of halides in air, the method of the invention may suitably be employed for the detection of halide in virtually any gaseous medium.

Figure 1:
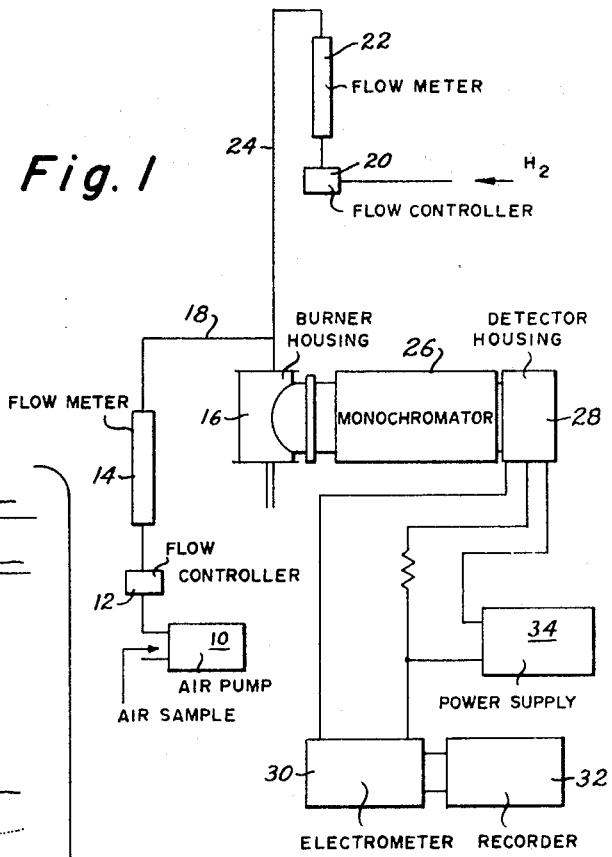

A block diagram depicting the arrangement of the apparatuses necessary to carry out the method of the invention is set forth in FIG. 1. As is readily apparent, the arrangement is characteristic of a conventional flame spectrophotometric system.

An air sample is sent by air pump 10 through flow controller 12 and flowmeter 14 to the burner housing 16 by means of line 18. In this preferred embodiment, the source of oxygen is the air itself. Hydrogen flows through flow controller 20 and flowmeter 22 into delivery line 24. The air sample passing through line 18 joins line 24 before entering the burner 16. The spectral emission intensity distributions were measured by a monochromator 26 passing only the emission wavelength desired during sensitivity determinations for detection by detector 28. Detector 28 is coupled through conventional circuitry to electrometer 30 and recorder 32. The detecting-recording apparatus 28, 30 and 32 are powered by power supply 34.

The above-described ratio of hydrogen to oxygen is based upon the stoichiometric requirements of the reaction between hydrogen and oxygen to produce water. Accordingly, the ratio is expressed as $H_2:O$ on a volume/volume basis.

It has been found that accurate and reproducible spectra may be obtained only when the sample to be analyzed is burned in an oxygen-hydrogen flame wherein the $H_2:O$ ratio (vol./vol.) is within the range of from about 1.0 to about 1.5. Although spectra may be obtained when employing ratios outside the stated range, they are of insufficient stability and intensity to enable accurate analyses.

The invention will be further illustrated by the following nonlimiting example:

EXAMPLE

A flame spectrophotometric system as depicted in FIG. 1 was employed to carry out the analyses. The photomultiplier tube (not shown) employed in the system had an S-4 response. The burner was provided with an opaque baffle (not shown) to prevent direct light from the combustion zone from reaching the detector. As a result, only the chemiluminescent glow produced by the combustion of the halide sample downstream from the flame is detected by the photomultiplier. An American Instrument Co. scanning monochromator containing a grating with 600 lines/mm. blazed at 3,000 A. was employed to determine spectral emission intensity distributions and to selectively pass only the emission wavelength desired during sensitivity determinations. A Neptune Products, Inc. Model No. 4–K stainless steel Dyna-Pump with Kel–F diaphragm and check valves was used to pump samples and air through Teflon tubing to the burner housing. Brooks Instrument Co. Model 8843 ELF flow controllers were employed to regulate air and hydrogen flow rates to the burner.

For chemiluminescence spectral distributions studies, the system was operated with 620 v. across the photomultiplier tube, 0.5 mm. width slits on the monochromator and a scanning rate of 50 m$\mu$/min. The technique described by Altschuller et al. (*Intern. J. Air Water Pollution*, Vol. 6, p. 75, (1962)) employing polyester plastic bags was employed to prepare the sample concentrations in dry air.

After equilibrium conditions had been established in the system, spectral emission scans were made at each of the six hydrogen and airflow rates listed in table 1, while the burner was receiving each of the following samples: filtered room air, 25 p.p.m. (vol./vol.) $CH_3I$, 50 p.p.m. (vol./vol.) $CHCl_3$ and 25 p.p.m. (vol./vol.) $BrCH_2CH_2Br$.

TABLE I

BURNER OPERATING MODES

| Operating mode | $H_2$ flow rate, ml./min. | Airflow rate ml./min. | $H_2$:0 |
| --- | --- | --- | --- |
| A | 206 | 604 | 0.85 |
| B | 234 | 572 | 1.02 |
| C | 234 | 540 | 1.08 |
| D | 264 | 470 | 1.41 |
| E | 296 | 400 | 1.85 |
| F | 328 | 400 | 2.05 |

Figure 2:
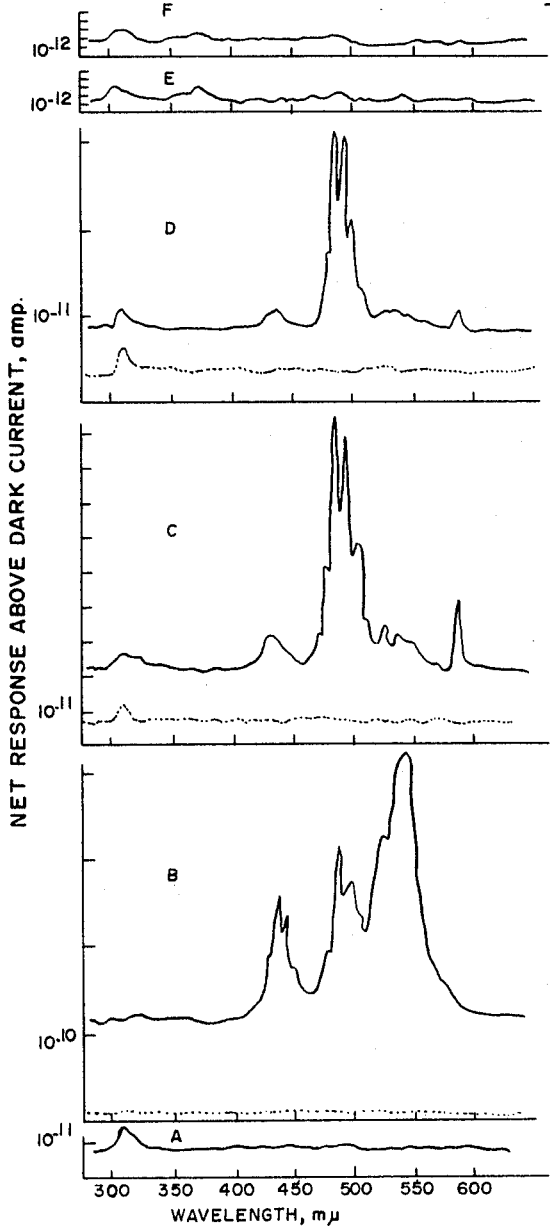

FIGS. 2, 3 and 4 illustrate, respectively, the chemiluminescence spectra of 50 p.p.m. (vol./vol.) $CHCl_3$, 25 p.p.m. (vol./vol.) $BrCH_2CH_2Br$ and 25 p.p.m. (vol./vol.) $CH_3I$ under each of the six-burner operating modes set forth in table I. In each of the Figures, the dashed line illustrates the filtered air-flame background spectra at the same instrument sensitivity setting and burner operating mode as the sample spectrum. Figures which illustrate only the sample spectra represent burner operating modes where there were not detectable differences between the sample and flame background spectra.

The abscissa in each illustration represent the photomultiplier tube dark current.

As is apparent from the Figures, stable and intense spectra are produced for each of the halides analyzed within the $H_2$:0 ratio range specified above.

Analyses conducted outside this range produce very weak or nonexistent spectral emissions.

The above system was operated exactly as described above with the exceptions that the samples employed comprised 2 p.p.m. (vol./vol.) $CS_2$ and 10 p.p.m. (vol./vol.) $(CH_3O)_3$ P. These samples were found to emit characteristic spectra only under conditions of highest $H_2$:0 ratio, thereby evidencing the specificity of the method of the invention for organic halides.

It will be apparent to those skilled in the art that the spectral emissions of the halides may be employed to quantitatively determine the amounts of halides present in the samples. Thus, when plotting the spectra versus the net response above dark current as in FIGS. 2, 3 and 4, the amounts of halides present may be easily determined as a function of the intensity of the emission.

It will be further apparent to those skilled in the art that the method of the invention is invaluable as an analytical method for determining not only the presence of but the quantity present of organic halides in a wide variety of materials.

What is claimed is:

1. A method for detecting the presence of halides in a gas comprising contacting said gas with a flame produced by the combustion of a mixture comprising hydrogen and a source of oxygen in the absence of a foreign element and analyzing the spectral emission of the chemiluminescence produced by said contact for the presence of halides in said gas, said mixture of hydrogen and oxygen source being such that the $H_2$:0 ratio is approximately 1.

2. A method according to claim 1 wherein said halides are organic halides.

3. A method according to claim 2 wherein said halides are selected from the group consisting of chlorides, bromides, iodides and mixtures thereof.

4. A method according to claim 2 wherein said gas comprises a mixture of air and said halide.

5. A method according to claim 2 wherein said spectral emission is quantitatively analyzed as a function of spectral wavelength versus dark current response.

6. A method according to claim 2 wherein said $H_2$:0 ratio is in the range of from about 1.0 to about 1.5.

7. A method according to claim 2 wherein said source of oxygen comprises air.

8. A method for detecting the presence of organic halides selected from the group consisting of chlorides, bromides, iodides and mixtures thereof in air comprising contacting a sample of said air with a flame produced by the combustion of a mixture of hydrogen and air in the absence of a foreign element and quantitatively analyzing the spectral emission of the chemiluminescence produced by said contact for the presence of said halides in said air as a function of spectral wavelengths versus dark current response, said mixture of hydrogen and air being such that the $H_2$:0 ratio is in the range of from about 1.0 to about 1.5.

* * * * *